(12) United States Patent
Tu et al.

(10) Patent No.: US 9,386,306 B2
(45) Date of Patent: Jul. 5, 2016

(54) ENHANCEMENT LAYER SCAN ORDER DERIVATION FOR SCALABLE VIDEO CODING

(71) Applicant: QUALCOMM Incorporated, San Diego, CA (US)

(72) Inventors: Chengjie Tu, San Diego, CA (US); Jianle Chen, San Diego, CA (US); Marta Karczewicz, San Diego, CA (US); Liwei Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 13/964,788

(22) Filed: Aug. 12, 2013

(65) Prior Publication Data

US 2014/0050261 A1 Feb. 20, 2014

Related U.S. Application Data

(60) Provisional application No. 61/683,688, filed on Aug. 15, 2012.

(51) Int. Cl.
*H04B 1/66* (2006.01)
*H04N 11/02* (2006.01)
*H04N 11/04* (2006.01)
*H04N 7/12* (2006.01)
*H04N 19/129* (2014.01)
*H04N 19/176* (2014.01)
*H04N 19/61* (2014.01)
(Continued)

(52) U.S. Cl.
CPC ....... *H04N 19/00109* (2013.01); *H04N 19/129* (2014.11); *H04N 19/14* (2014.11); *H04N 19/176* (2014.11); *H04N 19/33* (2014.11); *H04N 19/61* (2014.11); *H04N 19/46* (2014.11)

(58) Field of Classification Search
None
See application file for complete search history.

(56) References Cited

U.S. PATENT DOCUMENTS

| 2005/0074177 A1 | 4/2005 | Ichimura et al. |
| 2006/0153294 A1 | 7/2006 | Wang et al. |

(Continued)

FOREIGN PATENT DOCUMENTS

| EP | 1041826 A1 | 10/2000 |
| EP | 2280548 A1 | 2/2011 |

(Continued)

OTHER PUBLICATIONS

International Search Report and Written Opinion—PCT/US2013/054787—ISA/EPO—Jan. 22, 2014.

(Continued)

*Primary Examiner* — Frederick Bailey
*Assistant Examiner* — Talha M Nawaz
(74) *Attorney, Agent, or Firm* — Knobbe, Martens, Olson & Bear, LLP

(57) ABSTRACT

An apparatus for coding video information includes a memory unit configured to store video information associated with a reference block; and a processor in communication with the memory unit, wherein the processor is configured to determine a value of a current video unit associated with the reference block based on, at least in part, a classification of the reference block and a scan order selected by the processor based upon the classification. The scan order indicates an order in which values within the reference block are processed to at least partially determine the value of the current video unit.

35 Claims, 7 Drawing Sheets

(51) Int. Cl.
*H04N 19/14* (2014.01)
*H04N 19/33* (2014.01)
*H04N 19/46* (2014.01)

(56) References Cited

U.S. PATENT DOCUMENTS

| | | | |
|---|---|---|---|
| 2006/0233255 | A1 | 10/2006 | Ridge et al. |
| 2011/0026844 | A1* | 2/2011 | Francois ............... H04N 19/176 382/233 |
| 2013/0128985 | A1 | 5/2013 | He et al. |
| 2014/0009574 | A1* | 1/2014 | Hannuksela ..... H04N 19/00769 348/42 |
| 2014/0105290 | A1* | 4/2014 | Kwon ............... H04N 19/00763 375/240.12 |
| 2014/0161190 | A1* | 6/2014 | Park ................. H04N 19/00018 375/240.16 |

FOREIGN PATENT DOCUMENTS

| | | |
|---|---|---|
| WO | 2007079782 A1 | 7/2007 |
| WO | WO-2007079964 A1 | 7/2007 |

OTHER PUBLICATIONS

Lee J. H. et al., "An Efficient Encoding of DCT Blocks With Block-Adaptive Scanning", IEICE Transactions on Communications, Dec. 1, 1994, vol. E77-B, No. 12, Communications Society, Tokyo, JP, pp. 1489-1494, XP000498064, ISSN: 0916-8516.

Schiller H., "Prediction Signal Controlled Scans for Improved Motion Compensated Video Coding", Electronic Letters, Mar. 4, 1993, vol. 29, No. 5, IEE Stevenage, GB, pp. 433-435, XP000349849, ISSN: 0013-5194.

* cited by examiner

ENHANCEMENT LAYER SCAN ORDER DERIVATION FOR SCALABLE VIDEO CODING

CROSS-REFERENCE TO RELATED APPLICATIONS

This application claims priority to U.S. Provisional No. 61/683,688, filed Aug. 15, 2012, which is incorporated by reference in its entirety.

FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to scanning the quantized transform coefficients initially arranged in a two-dimensional array to produce a one-dimensional vector. This present disclosure is related to scalable video coding (SVC) extension of the HEVC and H.264/AVC. In this extension, a video frame typically includes multiple layers (e.g., two or more), including a base layer (BL) and enhanced layer (EL), as discussed in greater detail below. HEVC, H.264/AVC or other codecs are typically used for base layer compression, and enhanced layers are typically HEVC based.

To encode an enhancement layer block, a best matched reference block is found first. The reference block could be derived from already reconstructed neighbor pixels within the same frame (intra mode), previously reconstructed frames (inter mode), just the co-located base layer block (texture bl mode (the base layer may be up-sampled in the case of spatial scalability)), or even some combination of multiple modes. The difference (residual) between the EL block and the reference block is then transformed, quantized, and entropy coded.

To entropy code the quantized transform coefficients of a residual block, they are first converted into a 1D array using certain, often predetermined, scan orders. Entropy coding is designed in such a way that the better the 1D array is decreasingly ordered in terms of coefficient magnitudes, the higher the compression efficiency is. Therefore, a good scan order should put big coefficients at the beginning or head of the array and smaller and zero coefficients at the end of the array. By arranging transform coefficients in this manner, coding efficiency may be significantly improved.

HEVC uses three scan orders: vertical scan, horizontal scan, and diagonal scan. The three scan orders are graphically illustrated in FIGS. 4A-4C and discussed in greater detail, below. Horizontal scanning (see FIG. 4A) typically works better and yields improved coding efficiency if a video block has strong vertical textures. Vertical scanning (see FIG. 4B) typically works better and yields improved coding efficiency if a video block has strong horizontal textures. Diagonal scanning (see FIG. 4C) typically works better otherwise, such as when a video block has neither strong horizontal nor vertical texture.

However, in HEVC, vertical and horizontal scanning of a two-dimensional array is only used for certain sized blocks (i.e., 4×4 or 8×8 intra predicted blocks) and using certain prediction angles. Diagonal scanning is used otherwise, even if a particular block has strong vertical or horizontal textures. In scalable video coding, the enhancement layer is often predicted from a base layer, which under traditional techniques, would be scanned using a non-ideal diagonal scan order. This can lead to complications and difficulties in enhancement layer coding.

The present disclosure addresses the problem of having non-optimal scan order in enhancement layer coding. Using the techniques described herein, scan order is derived according to the contents of either the co-located base block or the reference block (e.g., if it is an inter-predicted block or the co-located base block is not available). The scan order may be derived regardless of the size or prediction angle, or both, associated with the enhancement layer block. This scan order derivation technique can apply to only specific modes (for example, texture bl mode) or all the modes, with or without residual prediction, only specific block sizes (for example 4×4 or 8×8) or all block sizes, luma only or all channels. In one embodiment, if diagonal scan is chosen using traditional techniques, the scan order can be replaced with a scan order selected or derived using the techniques described herein. In one embodiment, if vertical or horizontal scan is chosen using traditional techniques, the scan order can either stay or be replaced with a scan order selected or derived using the techniques described herein.

In one embodiment, a reference block or co-located base block is initially classified into a particular type, and then a scan order is selected based upon the classification.

In one embodiment, an apparatus for coding video information includes a memory unit and a processor. The memory unit is configured to store video information associated with a reference block. The processor is in communication with the memory unit. The processor is configured to determine a value of a current video unit associated with the reference block based on, at least in part, a classification of the reference block and a scan order selected by the processor based upon the classification. The scan order indicates an order in which values within the reference block are processed to at least partially determine the value of the current video unit.

In yet another embodiment, a method of coding video information includes storing video information associated with a reference block of a current video unit. The method also includes determining a classification of the reference block based upon the video information and determining a scan order of the current video unit based upon the classification. The method also includes generating a one-dimensional array of information associated with the current vide unit at least in part based upon the scan order.

The details of one or more examples are set forth in the accompanying drawings and the description below. Other features, objects, and advantages will be apparent from the description and drawings, and from the claims.

DETAILED DESCRIPTION

Figure 1:
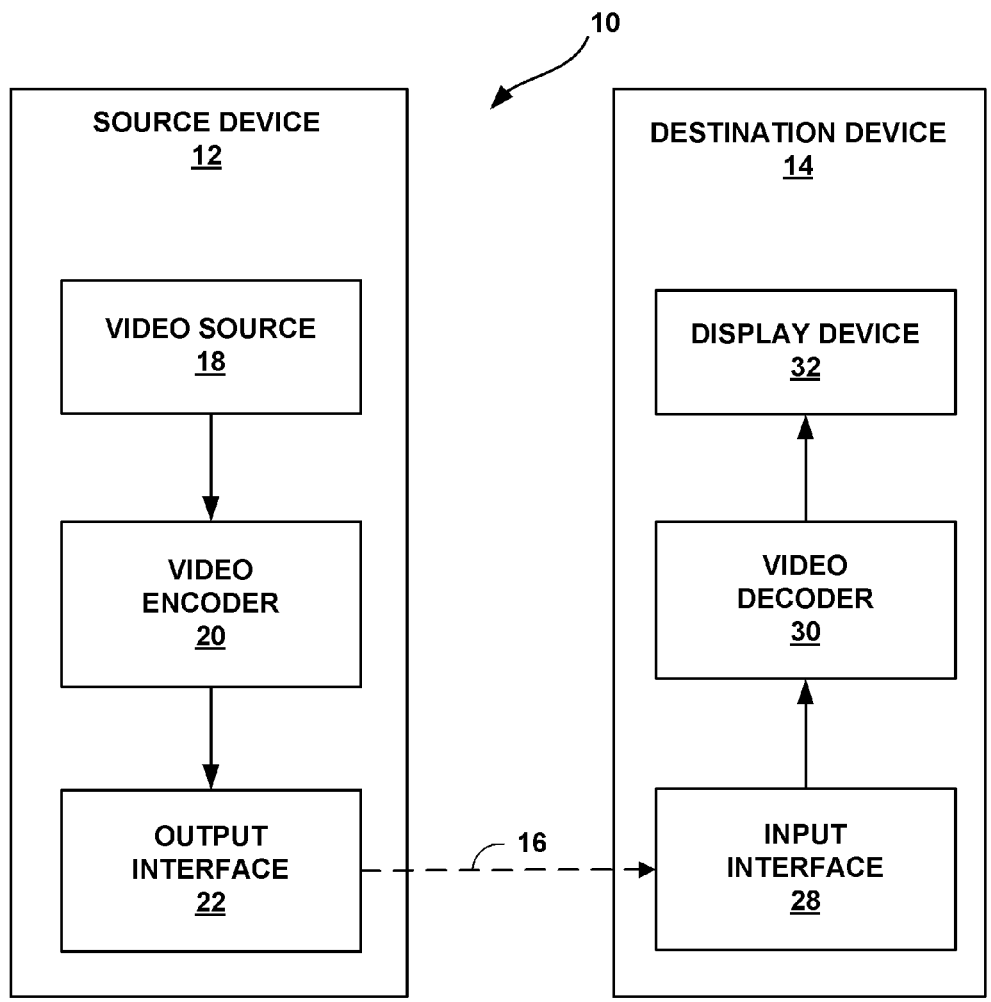
FIG. 1 is a block diagram illustrating an example video encoding and decoding system that may utilize techniques in accordance with aspects described in this disclosure.

The techniques described in this disclosure generally relate to scalable video coding (SVC) and 3D video coding. For example, the techniques may be related to, and used with or within, a High Efficiency Video Coding (HEVC) scalable video coding (SVC) extension. As mentioned above, in video coded according to the SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base layers and enhancement layers as well.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://wg11.sc29.org/jct/doc_end_user/current_document.php?id=5885/JCTVC-I11003-v2, as of Jun. 7, 2012. Another recent draft of the HEVC standard, referred to as "HEVC Working Draft 7" is downloadable from http://phenix.it-sudparis.eu/jct/doc_end_user/documents/9_Geneva/wg11/JCTVC-I1003-v3.zip, as of Jun. 7, 2012. The full citation for the HEVC Working Draft 7 is document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9$^{th}$ Meeting: Geneva, Switzerland, Apr. 27, 2012 to May 7, 2012. Each of these references is incorporated by reference in its entirety.

Scalable video coding (SVC) may be used to provide quality (also referred to as signal-to-noise (SNR)) scalability, spatial scalability and/or temporal scalability. An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. Inter-layer residual prediction uses the residue of the base layer to predict the residue of the enhancement layer.

In inter-layer residual prediction, the residue of the base layer may be used to predict the current block in the enhancement layer. The residue may be defined as the difference between the temporal prediction for a video unit and the source video unit. In residual prediction, the residue of the base layer is also considered in predicting the current block. For example, the current block may be reconstructed using the residue from the enhancement layer, the temporal prediction from the enhancement layer, and the residue from the base layer. The current block may be reconstructed according to the following equation:

$$\hat{I}_e = r_e + P_e + r_b \quad (1)$$

where $\hat{I}_e$ denotes the reconstruction of the current block, $r_e$ denotes the residue from the enhancement layer, $P_e$ denotes the temporal prediction from the enhancement layer, and $r_b$ denotes the residue prediction from the base layer.

In order to use inter-layer residual prediction for a macroblock (MB) in the enhancement layer, the co-located macroblock in the base layer should be an inter MB, and the residue of the co-located base layer macroblock may be upsampled according to the spatial resolution ratio of the enhancement layer (e.g., because the layers in SVC may have different spatial resolutions). In inter-layer residual prediction, the difference between the residue of the enhancement layer and the residue of the upsampled base layer may be coded in the bitstream. The residue of the base layer may be normalized based on the ratio between quantization steps of base and enhancement layers.

SVC extension to H.264 requires single-loop decoding for motion compensation in order to maintain low complexity for the decoder. In general, motion compensation is performed by adding the temporal prediction and the residue for the current block as follows:

$$\hat{I} = r + P \quad (2)$$

where $\hat{I}$ denotes the current frame, r denotes the residue, and P denotes the temporal prediction. In single-loop decoding, each supported layer in SVC can be decoded with a single motion compensation loop. In order to achieve this, all layers that are used to inter-layer intra predict higher layers are coded using constrained intra-prediction. In constrained intra prediction, intra mode MBs are intra-coded without referring to any samples from neighboring inter-coded MBs. On the other hand, HEVC allows multi-loop decoding for SVC, in which an SVC layer may be decoded using multiple motion compensation loops. For example, the base layer is fully decoded first, and then the enhancement layer is decoded.

Residual prediction formulated in Equation (1) may be an efficient technique in H.264 SVC extension. However, its performance can be further improved in HEVC SVC extension, especially when multi-loop decoding is used in HEVC SVC extension.

In the case of multi-loop decoding, difference domain motion compensation may be used in place of residual prediction. In SVC, an enhancement layer may be coded using pixel domain coding or difference domain coding. In pixel domain coding, the input pixels for an enhancement layer pixels may be coded, as for a non-SVC HEVC layer. On the other hand, in difference domain coding, difference values for an enhancement layer may be coded. The difference values may be the difference between the input pixels for the enhancement layer and the corresponding scaled base layer reconstructed pixels. Such difference values may be used in motion compensation for difference domain motion compensation.

For inter coding using difference domain, the current predicted block is determined based on the difference values between the corresponding predicted block samples in the enhancement layer reference picture and the corresponding predicted block samples in the scaled base layer reference picture. The difference values may be referred to as the difference predicted block. The co-located base layer reconstructed samples are added to the difference predicted block in order to obtain enhancement layer reconstructed samples.

However, using difference domain motion compensation in inter-layer prediction introduces two sets of motion estimation and motion compensation, since motion estimation and motion compensation are often used for both pixel domain and difference domain. Introducing two sets of motion estimation and motion compensation can lead to higher buffer and computational cost, which may not be practical for an encoder or a decoder. In addition, coding two sets of motion vectors may reduce coding efficiency since motion field may become irregular when the two sets of motion vectors have different properties and are interleaved at coding unit (CU) level. Moreover, motion estimation in difference domain requires that the base layer and enhancement layer share the same motion. Further, difference domain motion compensation does not work with single-loop decoding since the derivation of differential pictures between two layers is based on fully reconstructed pictures of each layer. Accordingly, it would be advantageous to avoid redundancy in having two sets of motion estimation and motion compensation when using difference domain motion compensation. Also, it would be advantageous to extend difference domain motion compensation in single-loop decoding.

The techniques described in this disclosure may address issues relating to inter-layer residual prediction and difference domain motion compensation in SVC. The techniques may provide a generalized residual prediction (GRP) framework. As explained above, inter-layer residual prediction uses the residue of the reference layer in predicting the current video unit, for example, a block or a frame. In generalized residual prediction, the inter-layer residual prediction of the current video unit may be based on the residue of the current layer, the temporal prediction of the current layer, and the residue of the reference layer. The residue of the reference layer may be adjusted by a weighting factor. The weighting factor may be based on and include various types of information. Examples of such information may include number of weighting candidates, weighting step, weighting index, and weighting table.

The GRP framework according to aspects of this disclosure may accommodate various types of residual prediction by incorporating a weighting factor. Adjusting the weighting factor appropriately may lead to significant coding gains for residual prediction. In addition, in the GRP framework, residual prediction may be performed using a reference layer that is not necessarily the base layer in traditional residual prediction. For example, the reference layer may be derived from the current enhancement layer. The GRP may also accommodate traditional residual prediction when the weighting factor is set to 1. The GRP framework may be used with both single-loop decoding and multi-loop decoding. In addition, in the GRP framework, motion estimation in difference domain may not be necessary, and therefore, the current layer and the enhancement layer do not have to share the same motion for motion estimation. The GRP framework can apply to many different types of residual prediction, and the traditional residual prediction as defined in Equation (1) and difference domain motion compensation are two specific scenarios of using the GRP framework. The techniques may improve the performance of motion compensation in scalable extension of HEVC and may also apply to 3D video coding extension of HEVC.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 2:
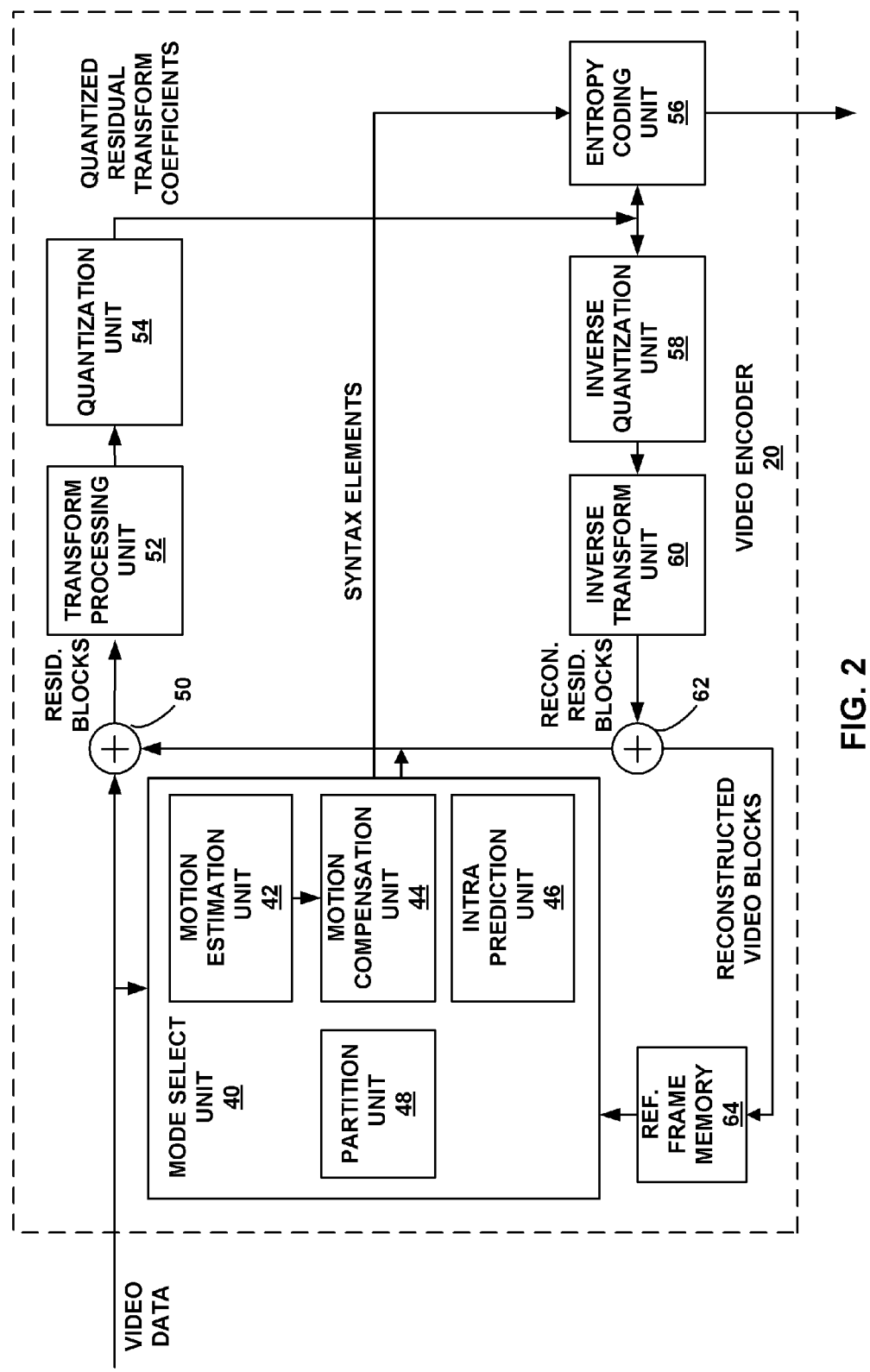
FIG. 2 is a block diagram illustrating an example of a video encoder that may implement techniques in accordance with aspects described in this disclosure.

FIG. 1 is a block diagram illustrating an example video encoding and decoding system that may utilize techniques in accordance with aspects described in this disclosure. For example, various modules of the system 10 may be configured to perform the scan order derivation techniques described in greater detail below with respect to FIGS. 4-7. As shown in FIG. 2, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 2, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 2 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

As discussed above, following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. In yet other embodiments, the scan order is derived based upon a classification of a reference block (e.g., a base layer block or a reference block from a different frame, either of which may be collocated with respect to the enhancement block currently being coded), as discussed below with respect to FIGS. 5 through 7.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

FIG. 2 is a block diagram illustrating an example of a video encoder 20 that may implement techniques in accordance with aspects described in this disclosure. Video encoder 20 may be configured to perform any or all of the techniques of this disclosure. For example, various modules of the encoder 20 may be configured to perform the scan order derivation techniques described in greater detail below with respect to FIGS. 4-7. As one example, mode select unit 40 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan. In some embodiments, the scan of the matrix is performed according to the methods described below with respect to FIGS. 5 through 7.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
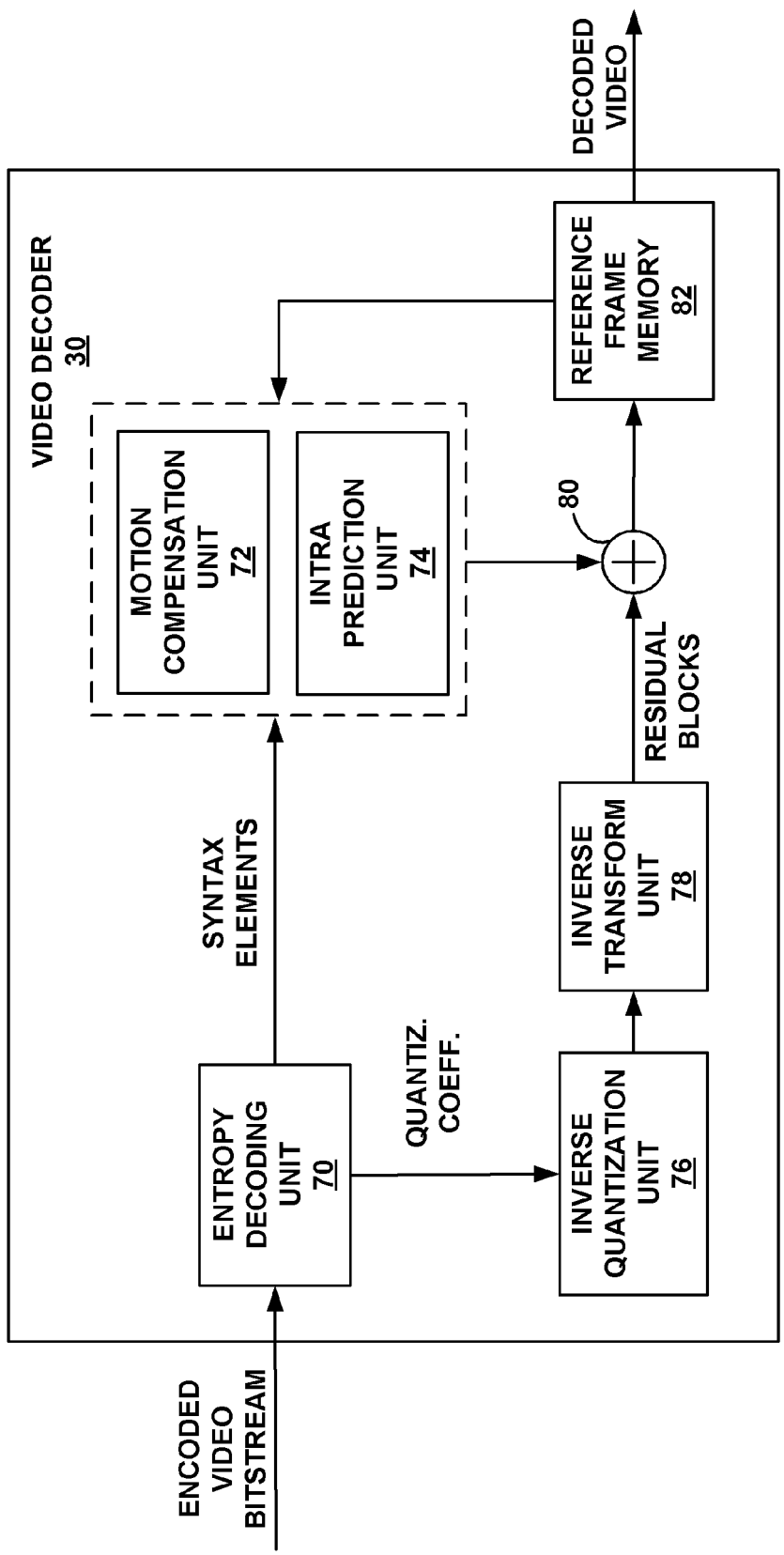
FIG. 3 is a block diagram illustrating an example of a video decoder that may implement techniques in accordance with aspects described in this disclosure.

FIG. 3 is a block diagram illustrating an example of a video decoder 30 that may implement techniques in accordance with aspects described in this disclosure. Video decoder 30 may be configured to perform any or all of the techniques of this disclosure. For example, various modules of the decoder 30 may be configured to perform the scan order derivation techniques described in greater detail below with respect to FIGS. 4-7. As one example, entropy decoding unit 70, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

FIG. 4 illustrates various scan orders that may be applied by the encoder 20 or decoder 30, discussed above, to convert a 4×4 block 400 (or any other size block) of video information into a bitstream for subsequent coding. The video block 400 has 16 sub-blocks, units, or pixels, arranged in a 4×4 grid, although other arrangements and sizes are possible. Each block 400 includes a top left unit 402, a top right unit 404, a bottom left unit 406, and a bottom right unit 408.

Figures 4A, 4B, 4C:
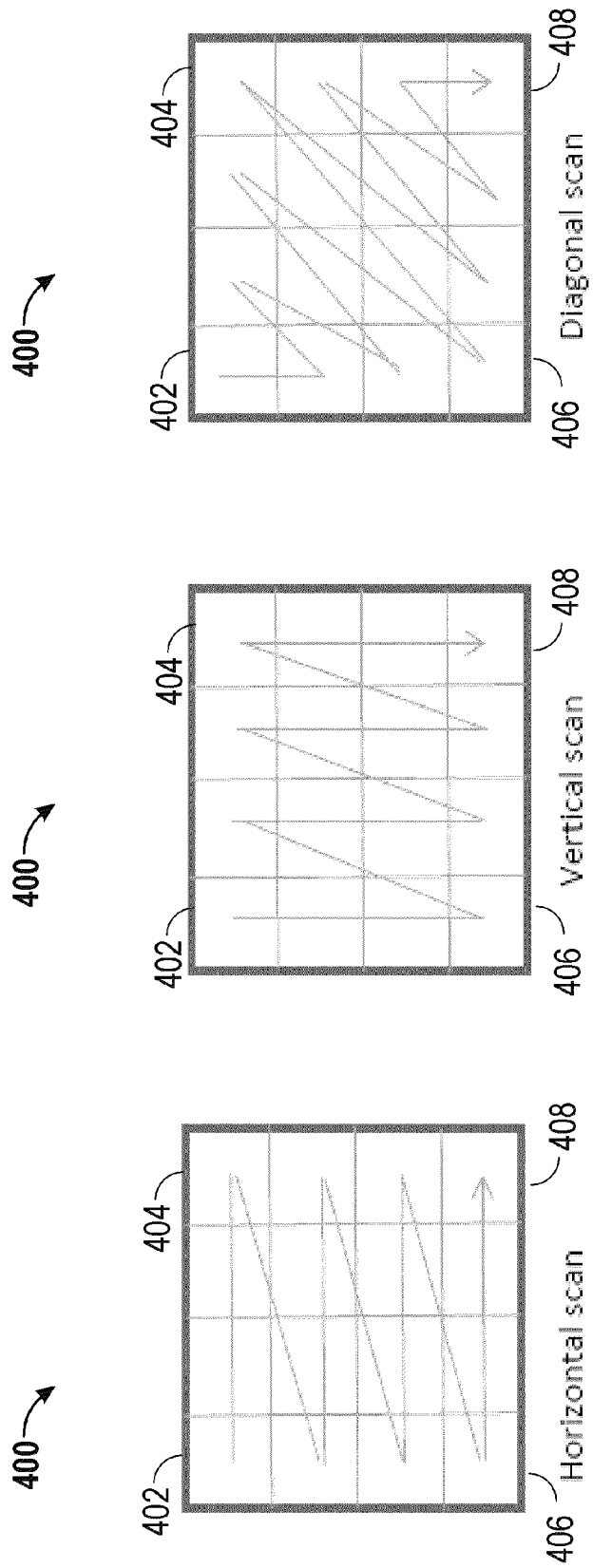
FIGS. 4A-4C illustrate horizontal, vertical, and diagonal scanning, respectively, of a 4×4 block of video information.

During horizontal scanning, as illustrated in FIG. 4A, the video units of the video block 400 are processed (or ordered or arranged in a bitstream) from left to right, beginning at the top row of the block 400. For example, the sixteen units within block 400 may be ordered across the top row from block 402 to block 404, then across the second row from the top, then across the third row from the top, and finally across the fourth row from the top, from block 406 to block 408.

During vertical scanning, as illustrated in FIG. 4B, the video units of the video block 400 are processed (or ordered or arranged in a bitstream) from top to bottom, beginning at the left-most column of the block 400. For example, the sixteen units within block 400 may be ordered down the leftmost column from block 402 to block 406, then down the second column from the left, then down the third column from the left, and finally down the fourth column from the left, from block 404 to block 408.

During diagonal scanning, as illustrated in FIG. 4C, the video units of the video block 400 are processed (or ordered or arranged in a bitstream) along a diagonal direction from lower left to upper right, beginning with the top left unit 402, then from the unit below unit 402 in a diagonal direction to the unit to the right of unit 402, then from the unit two below unit 402 in a diagonal direction to the unit two to the right of unit 402, then from the bottom left unit 406 in a diagonal direction to the upper right unit 404, etc. until unit 408 at the lower right corner of the block 400.

Figure 5:
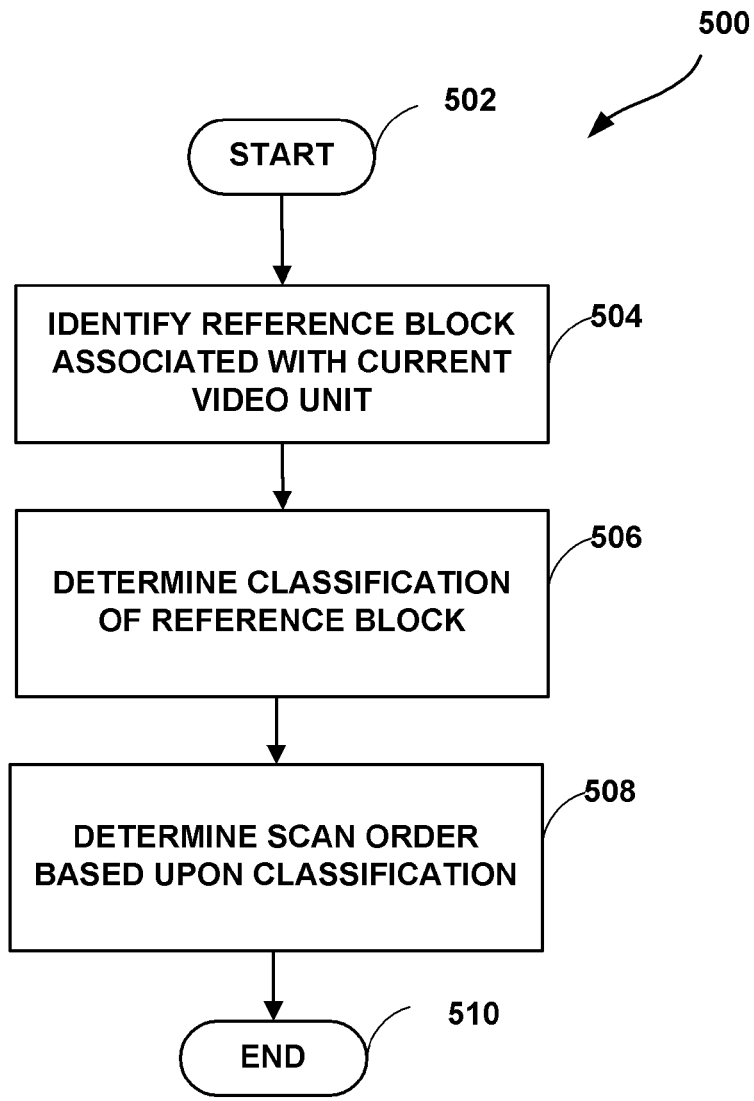
FIG. 5 is a flowchart illustrating an example method to determine a scan order of a reference block according to aspects of this disclosure.
Figure 6:
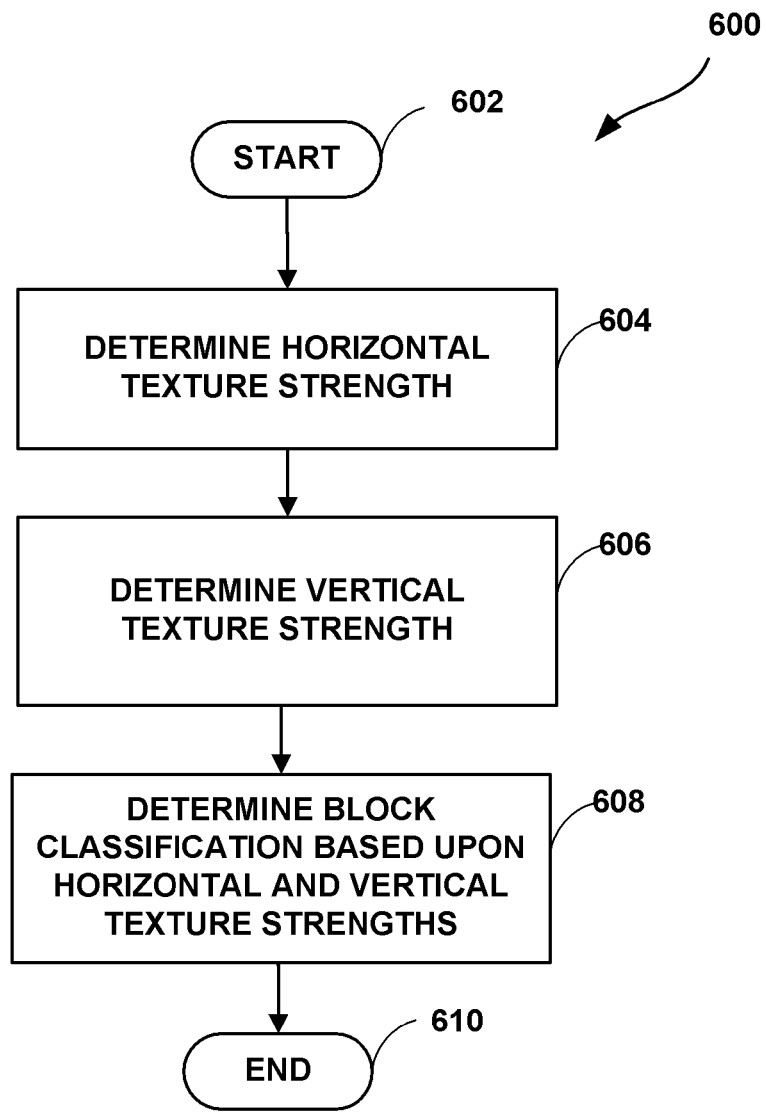
FIG. 6 is a flowchart illustrating an example method to determine block classification according to aspects of this disclosure.
Figure 7:
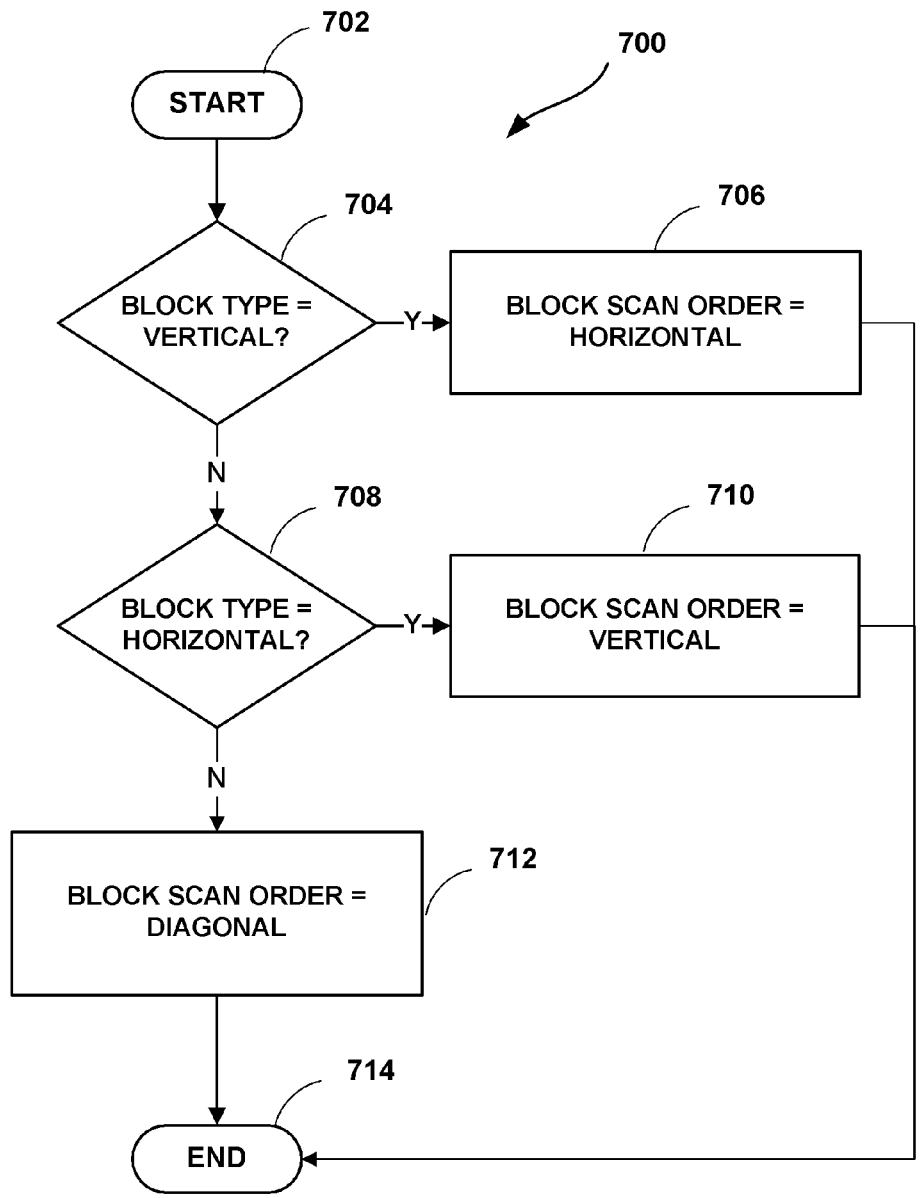
FIG. 7 is a flowchart illustrating an example method to determine a block scan order according to aspects of this disclosure.

The methods of FIGS. 5, 6, and 7 relate to determining or deriving the order in which the information within a two dimensional block are processed during scalable video coding, as discussed above. FIG. 5 describes one embodiment of a method to determine a scan order of an enhancement layer block based upon a classification of a reference block (e.g., from base layer or reference layer) associated with the enhancement layer block. FIG. 6 describes one embodiment of a method to determine the reference block's classification. FIG. 7 describes another embodiment of a method to determine a block scan order.

Block Classification

A reference block associated with an enhancement layer block may be determined. The reference block may be a block located in a base layer or a previous frame, as discussed above. The reference block may be collocated with respect to the enhancement layer block. The reference block used to derive the scan order of the enhancement layer block is classified as one of several types. In one embodiment, three classification types are used: e.g., vertical texture dominated, horizontal texture dominated, and else (where the block is neither vertical nor horizontal texture dominated). More types could be used to provide finer classification. For example, in some embodiments the classification can be diagonal texture dominated, etc. Chroma channels can either use luma's classification or derive their own. Different chroma channels can use a same classification or different classifications.

In some embodiments, classification is performed or calculated in the pixel domain, e.g., directly based on gradient or other measurements. For example, in one embodiment, a block size is w×h and the pixel value at position (x, y) is $p_{x,y}$ where 0≤x<w and 0≤y<h. One example classification method could be:

$$HS = \sum_{y+1<h}^{y=0} \sum_{x<w}^{x=0} f(p_{x,y} - p_{x,y+1})$$

$$VS = \sum_{x+1<w}^{x=0} \sum_{y<h}^{y=0} f(p_{x,y} - p_{x+1,y})$$

if(HS < threshold1 && VS < threshold1)

uniform else if(HS > threshold2 ∗ VS)

horizontal else if(VS > threshold2 ∗ HS)

vertical else uniform where $f(x)$ is a magnitude function (e.g., $f(x)=abs(x)$ or $f(x)=x^2$, etc., and threshold1 and threshold2 are some constant thresholds pre-trained to minimize coding efficiency. For example if f(x)=abs(x), a reasonable choice is threshold1=2∗w∗h and threshold2=2. In addition, && represents logical AND.

For example, if the horizontal strength of the block (HS) and the vertical strength of the block (VS) are both below an initial threshold (threshold1), then classify the block as having uniform strength. Otherwise, if the horizontal strength is greater than a second threshold (e.g., the product of threshold2 and VS), then classify the block as having horizontal strength. Otherwise, if the vertical strength is greater than a second threshold (e.g., the product of threshold2 and HS), then classify the block as having vertical strength. Otherwise, classify the block as having uniform strength.

In one embodiment, classification is performed or calculated in the transform domain. For example, in one embodiment, the coefficient block is w×h and the coefficient at position (x, y) is $c_{x,y}$, where 0≤x<w and 0≤y<h. One example classification method could be:

$$HS = \sum_{y<h}^{y=0} f(c_{0,y})$$

$$VS = \sum_{x<w}^{x=0} f(c_{x,0})$$

if(HS < threshold1 && VS < threshold1)

uniform else if(HS > threshold2 ∗ VS)

horizontal else if(VS > threshold2 ∗ HS)

vertical else uniform where $f(x)$ is a magnitude function (e.g., $f(x)=abs(x)$ or $f(x)=x^2$, etc., and threshold1 and threshold2 are some constant thresholds pre-trained to maximize coding efficiency and && represents logical AND.

For example, if the horizontal strength of the block (HS) in the transform domain and the vertical strength of the block (VS) in the transform domain are both below an initial threshold (threshold1), then classify the block as having uniform strength. Otherwise, if the horizontal strength is greater than a second threshold (e.g., the product of threshold2 and VS), then classify the block as having horizontal strength. Otherwise, if the vertical strength is greater than a second threshold (e.g., the product of threshold2 and HS), then classify the block as having vertical strength. Otherwise, classify the block as having uniform strength.

Both example classification methods above classify a block into one of three types: horizontal, vertical, and uniform. In other embodiments, the block is classified into one of more than three predetermined classification types.

Scan Order Derivation

Once a block is classified, a scan order (e.g., an optimal scan order) is derived based upon the block classification type. In some embodiments, the scan order is chosen from the three known HEVC scan orders (horizontal scan, vertical scan, diagonal scan). In some embodiments, new scan orders are used either to replace the HEVC scan orders or as additional scan order options.

If blocks are classified into three types (e.g., horizontal, vertical, uniform) as described above and the three HEVC scan orders (horizontal scan, vertical scan, diagonal scan) are used, one embodiment for scan order derivation could be:

```
if(block type is vertical)
    horizontal scan
else if(block type is horizontal)
    vertical scan
else
    diagonal scan
```

For example, if the block type is vertical (having vertical strength), then use a horizontal scan method (as illustrated in FIG. 4A). If the block type is horizontal (having horizontal strength), then use a vertical scan method (as illustrated in FIG. 4B). Otherwise, or if the block has uniform strength, use a diagonal scan method (as illustrated in FIG. 4C).

Scan Order Signaling

In some embodiments, the scan order is signaled in the bitstream. In such embodiments, different context models can be used for different classifiers to reduce bitstream overhead.

FIG. 5 illustrates one embodiment of a method 500 of determining a scan order of (e.g., using) a reference block. The method 500 may be performed by any of the devices described herein, including the encoder 20 of FIG. 2 or the decoder of FIG. 3. The term reference block is a broad term intended to have its ordinary meaning. In addition, in some embodiments, reference block refers to a base layer block, such as a base layer block that is co-located with respect to a current block in a corresponding enhancement layer. A co-located block can include a block located at the same relative position of the current block being processed, but within a different layer of the block's video frame (and which may be scaled). In other embodiments, the reference block is within the same layer as the current block being processed. In yet other embodiments, the reference block is within a different frame than the current block being processed.

The method 500 begins at block 502. At block 504, the method 500 identifies a reference block associated with the current video unit that is being processed. At block 506, the method 500 determines a classification of the reference block 506. At block 508, the method 500 determines a scan order (e.g., of the current video unit) based upon the classification. The method 500 ends at block 510.

FIG. 6 illustrates one embodiment of a method of determining a block classification. The method 600 may be performed at block 506 of method 500. In addition, the method 500 may be performed by any of the devices described herein, including the encoder 20 of FIG. 2 or the decoder of FIG. 3.

The method 600 begins at block 602. At block 604, the method 600 determines a horizontal scan value, such as texture strength. For example, the method 600 may determine the horizontal strength, or texture strength, of the block, such as HS, described above. At block 606, the method 600 determines a vertical scan value, such as the vertical strength, or texture strength, of the block, such as VS, described above. At block 608, the method 600 determines a block classification based upon the horizontal and vertical scan values, or texture strengths. The method 600 ends at block 610. The classification may be determined according to any of the techniques described herein, including those described above using HS and VS (e.g., texture strength) values. The classification may include "horizontal," "vertical," or "uniform," as discussed above, or any other classification.

FIG. 7 illustrates one embodiment of a method of determining a current block scan order based upon the type (e.g., classification) of a reference block associated with the current block. As discussed above, the current block can be an enhancement layer block and the reference block can be a block in a base layer, for example, but not limited to, a co-located block in the base layer. In another embodiment, as discussed above, the current block can be in an enhancement or base layer, and the reference block can be in the same layer and in the same or a previous frame. The method 700 may be performed at block 508 of method 500. In addition, the method 500 may be performed by any of the devices described herein, including the encoder 20 of FIG. 2 or the decoder of FIG. 3.

The method 700 begins at block 702. At block 704, the method 700 determines whether the reference block type is vertical. If so, the method 700 proceeds to block 706 where a block scan order is set to horizontal. The method 700 then ends at block 714. If at block 704 the method 700 determines that the block type is not vertical, the method 700 proceeds to block 708.

At block 708, the method 700 determines whether the block type is horizontal. If so, the method 700 proceeds to block 710 where a block scan order is set to vertical. The method 700 then ends at block 714. If at block 708 the method 700 determines that the block type is not horizontal, the method 700 proceeds to block 712. At block 712, the method 700 sets the block scan order to diagonal. The method then terminates at block 714.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for coding video information, comprising:
a memory configured to store video information associated with a reference block; and
a processor in communication with the memory, wherein the processor is configured to:
determine a classification of the reference block based upon a horizontal texture strength and a vertical texture strength associated with the reference block, wherein the horizontal texture strength and the vertical texture strength are determined as a function of a difference between adjacent pixel values within the reference block;
select a scan order of a current video unit associated with the reference block based upon the determined classification; and
determine a value of the current video unit based on, at least in part, the selected scan order,
wherein the scan order indicates an order in which values within the reference block are processed to at least partially determine the value of the current video unit.

2. The apparatus of claim 1, wherein the reference block is:
(a) derived from reconstructed pixels adjacent to or near the current video unit;
(b) derived from one or more previously reconstructed frames; or
(c) derived from a block located in a corresponding position within a different layer of a frame in which the current video unit is located.

3. The apparatus of claim 1, wherein the reference block is a co-located base layer block.

4. The apparatus of claim 1, wherein the reference block is determined based upon a mode selected from the group comprising: intra mode, inter mode, and texture bl mode.

5. The apparatus of claim 1, wherein the classification is selected from a group comprising: a vertical texture dominated classification, a horizontal texture dominated classification, a classification other than vertical or horizontal texture dominated, a diagonal texture dominated classification, a chroma channel classification, and a luma channel classification.

6. The apparatus of claim 1, wherein the processor is further configured to determine the classification in a pixel domain, on a gradient, or in a transform domain.

7. The apparatus of claim 1, wherein the function is selected from the group comprising: an absolute value of the difference, a square of the difference, and whether the difference is greater than a predetermined threshold.

8. The apparatus of claim 1, wherein the classification is selected from the group comprising horizontal, vertical and uniform.

9. The apparatus of claim 1, wherein the scan order is selected from the group comprising a horizontal scan, a vertical scan, and a diagonal scan.

10. The apparatus of claim 1, wherein (a) a horizontal scan order is selected when the classification is vertical; (b) a vertical scan order is selected when the classification is horizontal; and (c) a diagonal scan order is selected when the classification is neither horizontal nor vertical.

11. The apparatus of claim 1, wherein the processor is configured to determine the value of the video unit by encoding the video unit.

12. The apparatus of claim 1, wherein the processor is configured to determine the value of the video unit by decoding the video unit.

13. The apparatus of claim 1, further comprising one or more of a desktop computer, a notebook computers, a laptop computer, a tablet computer, a set-top box, a telephone handset, a smart phone, a smart pad, a television, a camera, a display device, a digital media player, a video gaming console, or a video streaming device.

14. The apparatus of claim 1, wherein the processor is further configured to signal the scan order in a bitstream of video information.

15. The apparatus of claim 1, wherein the processor is configured to select the scan order based at least in part on a comparison of the horizontal texture strength and the vertical texture strength against one or more threshold values.

16. A method of coding video information, comprising:
storing video information associated with a reference block associated with a current video unit;
selecting a classification of the reference block from a group comprising a vertical texture dominated classification, a horizontal texture dominated classification, a classification other than vertical or horizontal texture dominated, a diagonal texture dominated classification, a chroma channel classification, and a luma channel classification based upon a horizontal scan value and a vertical scan value associated with the reference block, wherein the horizontal scan value and the vertical scan value are determined as a function of a difference between adjacent pixel values within the reference block;
selecting a scan order of the current video unit based upon the determined classification; and
generating a one-dimensional array of information associated with the current video unit based at least in part upon the selected scan order.

17. The method of claim 16, further comprising encoding the current video unit based upon the one-dimensional array of information.

18. The method of claim 16, wherein the reference block is:
(a) derived from reconstructed pixels adjacent to or near the current video unit;
(b) derived from one or more previously reconstructed frames; or
(c) derived from a block located in a corresponding position within a different layer of a frame in which the current video unit is located.

19. The method of claim 18, wherein the different layer comprises a base layer.

20. The method of claim 19, wherein the reference block is a co-located base layer block.

21. The method of claim 16, further comprising determining the classification in a pixel domain, on a gradient, or in a transform domain.

22. The method of claim 16, wherein the function is selected from the group comprising: an absolute value of the difference, a square of the difference, and whether the difference is greater than a predetermined threshold.

23. The method of claim 16, wherein the classification is selected from the group comprising horizontal, vertical and uniform.

24. The method of claim 16, wherein the scan order is selected from the group comprising a horizontal scan order, a vertical scan order, and a diagonal scan order.

25. The method of claim 16, wherein (a) a horizontal scan order is selected when the classification is vertical; (b) a vertical scan order is selected when the classification is horizontal; and (c) a diagonal scan order is selected when the classification is neither horizontal nor vertical.

26. The method of claim 16, further comprising signaling the scan order in a bitstream of video information.

27. The method of claim 16, wherein the scan order is selected based at least in part on a comparison of the horizontal scan value and the vertical scan value against one or more threshold values.

28. A non-transitory computer-readable storage medium having instructions stored thereon that when executed cause an apparatus comprising at least one processor to:
store video information associated with a reference block associated with a current video unit;
select a classification of the reference block from a group comprising a vertical texture dominated classification, a horizontal texture dominated classification, a classification other than vertical or horizontal texture dominated, a diagonal texture dominated classification, a chroma channel classification, and a luma channel classification based upon a horizontal scan value and a vertical scan value associated with the reference block, wherein the horizontal scan value and the vertical scan value are determined as a function of a difference between adjacent pixel values within the reference block;
select a scan order of the current video unit based upon the determined classification; and
generate a one-dimensional array of information associated with the current video unit based at least in part upon the selected scan order.

29. The non-transitory computer readable storage medium of claim 28, wherein the current video unit is located in an enhancement layer and the reference block comprises a base layer block co-located with respect to the current video unit.

30. The non-transitory computer-readable storage medium of claim 28, wherein the instructions stored thereon, when executed, further cause the apparatus to determine the scan order of the current video unit as: (a) a horizontal scan order when the classification is vertical; (b) a vertical scan order when the classification is horizontal; and (c) a diagonal scan order when the classification is neither horizontal nor vertical.

31. The non-transitory computer-readable storage medium of claim 28, wherein the instructions stored thereon, when executed, further cause the apparatus to select the scan order based at least in part on a comparison of the horizontal scan value and the vertical scan value against one or more threshold values.

32. An apparatus configured to code video information, the apparatus comprising:
means for storing video information associated with a reference block associated with a current video unit;
means for selecting a classification of the reference block from a group comprising a vertical texture dominated classification, a horizontal texture dominated classification, a classification other than vertical or horizontal texture dominated, a diagonal texture dominated classification, a chroma channel classification, and a luma channel classification based upon a horizontal scan value and a vertical scan value associated with the reference block, wherein the horizontal scan value and the vertical scan value are determined as a function of a difference between adjacent pixel values within the reference block;
means for selecting a scan order of the current video unit based upon the determined classification; and
means for generating a one-dimensional array of information associated with the current video unit based at least in part upon the selected scan order.

33. The apparatus of claim 32, wherein the current video unit is located in an enhancement layer and the reference block comprises a base layer block co-located with respect to the current video unit.

34. The apparatus of claim 32, wherein the means for determining the scan order is configured to determine the scan order of the current video unit as: (a) a horizontal scan order when the classification is vertical; (b) a vertical scan order when the classification is horizontal; and (c) a diagonal scan order when the classification is neither horizontal nor vertical.

35. The apparatus of claim 32, wherein the means for selecting the scan order is configured to select the scan order based at least in part on a comparison of the horizontal scan value and the vertical scan value against one or more threshold values.

* * * * *